US005235811A

United States Patent [19]

Arii et al.

[11] Patent Number: 5,235,811

[45] Date of Patent: Aug. 17, 1993

[54] CONTROL CHANGE SYSTEM FOR A HYDRAULIC WORK VEHICLE

[75] Inventors: Kazuyoshi Arii; Shiro Watanabe; Kazuhiko Tsuji; Kiyoshi Matsui, all os Osaka, Japan

[73] Assignee: Kubota Corporation, Osaka, Japan

[21] Appl. No.: 880,868

[22] Filed: May 11, 1992

Related U.S. Application Data

[63] Continuation-in-part of Ser. No. 691,617, Apr. 25, 1991, Pat. No. 5,125,232.

[30] Foreign Application Priority Data

| | | | |
|---|---|---|---|
| May 29, 1990 | [JP] | Japan | 2-140589 |
| May 30, 1990 | [JP] | Japan | 2-142906 |
| May 31, 1990 | [JP] | Japan | 2-57772[U] |
| May 31, 1990 | [JP] | Japan | 2-141800 |
| May 31, 1990 | [JP] | Japan | 2-141801 |
| Aug. 28, 1990 | [JP] | Japan | 2-227339 |

[51] Int. Cl.$^5$ .......... F16D 31/02

[52] U.S. Cl. .......... 60/484; 91/521; 91/529; 91/461; 137/596.015

[58] Field of Search .......... 60/484; 91/521, 522, 91/523, 529, 530, 461; 137/596.15, 635

[56] References Cited

U.S. PATENT DOCUMENTS

| | | | |
|---|---|---|---|
| 1,020,176 | 3/1912 | Astfalck | 91/521 |
| 4,398,861 | 8/1983 | Shimoie . | |
| 4,622,998 | 11/1986 | Kussel et al. | 137/596.15 |
| 4,736,647 | 4/1988 | Shimoie et al. . | |
| 4,986,165 | 1/1991 | Miyaoka . | |

FOREIGN PATENT DOCUMENTS

| | | | |
|---|---|---|---|
| 451090 | 10/1927 | Fed. Rep. of Germany | 91/521 |
| 24221 | 7/1989 | Japan . | |
| 60702 | 12/1989 | Japan . | |
| 7895 | of 1909 | United Kingdom | 137/596.15 |

*Primary Examiner*—Edward K. Look
*Assistant Examiner*—Hoang Nguyen
*Attorney, Agent, or Firm*—Edwin E. Greigg; Ronald E. Greigg

[57] ABSTRACT

A control change system for a backhoe in a construction vehicle, comprising a plurality of pilot valves for generating a pilot pressure corresponding to operations of a first and a second control levers, respectively, and a hydraulic switching unit for relaying the pilot pressure from the pilot valves and supplying the pilot pressure to a plurality of control valves. This switching unit includes a plurality of slidable spools for supplying the pilot pressure from the pilot valves selectively to the control valves. The control system further includes a first and a second switching members for selectively sliding the plurality of slidable spools. The first switching member is operable to select the swing cylinder or the hydraulic motor to be controlled by a shift in one direction of the first control lever. The second switching member is operable to switch interlocks between the first and second control levers and a boom cylinder and an arm cylinder.

5 Claims, 10 Drawing Sheets

FIG. 9

| | 1st SPOOL 41 | 2nd SPOOL 42 | 3rd SPOOL 43 | 5th SPOOL 45 |
|---|---|---|---|---|
| I | OUT | OUT | OUT | OUT |
| II | OUT | OUT | IN | OUT |
| III | IN | IN | OUT | OUT |
| IV | IN | IN | OUT | IN |
| V | IN | OUT | OUT | OUT |
| VI | OUT | IN | OUT | IN |

FIG.10

| | LEFT CONTROL LEVER 92 | RIGHT CONTROL LEVER 91 |
|---|---|---|
| I | ARM UP<br>LEFT SWIVEL ←o→ RIGHT SWIVEL<br>ARM DOWN | BOOM DOWN<br>BUCKET LOAD ←o→ BUCKET UNLOAD<br>BOOM UP |
| II | RIGHT SWIVEL<br>ARM UP ←o→ ARM DOWN<br>LEFT SWIVEL | BOOM DOWN<br>BUCKET LOAD ←o→ BUCKET UNLOAD<br>BOOM UP |
| III | BOOM DOWN<br>BUCKET UNLOAD ←o→ BUCKET LOAD<br>BOOM UP | ARM DOWN<br>LEFT SWIVEL ←o→ RIGHT SWIVEL<br>ARM UP |
| IV | BOOM DOWN<br>BUCKET UNLOAD ←o→ BUCKET LOAD<br>BOOM UP | ARM UP<br>LEFT SWIVEL ←o→ RIGHT SWIVEL<br>ARM DOWN |
| V | ARM UP<br>BUCKET UNLOAD ←o→ BUCKET LOAD<br>ARM DOWN | BOOM DOWN<br>LEFT SWIVEL ←o→ RIGHT SWIVEL<br>BOOM UP |
| VI | BOOM DOWN<br>LEFT SWIVEL ←o→ RIGHT SWIVEL<br>BOOM UP | ARM UP<br>BUCKET LOAD ←o→ BUCKET UNLOAD<br>ARM DOWN |

CONTROL CHANGE SYSTEM FOR A HYDRAULIC WORK VEHICLE

This is a continuation-in-part of copending application Ser. No. 07/691,617 filed on Apr. 25, 1991 now U.S. Pat. No. 5,125,232.

BACKGROUND OF THE INVENTION

1. Field of the Invention

The present invention relates to a control change system for a hydraulic working vehicle, and more particularly to a system for changing control patterns of hydraulic drive members for driving a boom assembly and a swivel deck of a backhoe.

2. Description of the Related Art

Such a system for changing control patterns of a boom assembly and a swivel deck of a backhoe is known from U.S. Pat. Nos. 4,398,861 and 4,736,647. The known system comprises hydraulic actuators for driving various parts of the boom assembly and the swivel deck, control valves for supplying and exhausting pressure oil to/from the hydraulic actuators, and a pair of right and left control levers operable fore and aft and right and left. The right and left control levers are mechanically connected to the control valves through push-pull wires and interlocking rods.

With fore and aft and right and left operation of the right and left control levers, the control valves are switched to operate the hydraulic actuators. More particularly, the righthand control lever, for example, is connected to the control valves such that its fore and aft operation moves a boom up and down, and right and left operation thereof causes a bucket to take a loading action. After the righthand lever is placed in a different interlocking relationship with the control valves, its fore and aft operation moves an arm of the boom assembly fore and aft, and right and left operation turns the swivel deck. In this way, control patterns of actuator drive by the control levers are changeable by relocating the push-pull wires and interlocking rods interconnecting the control levers and control valves.

When changing the control patterns as noted above, however, the push-pull wire and interlocking rods connecting one of the control levers to certain of the control valves must be dislodged once and placed in position to connect the other control lever to the same or different control valves. This operation is cumbersome, and it is almost impossible from the structural point of view to provide an increased number of control patterns available for selection.

A different type of control change system is known from Japanese Utility Model Publication No. 1989-24221 and Japanese Patent Publication No. 1989-60702. This system includes pilot pressure generators for supplying a pilot pressure in response to operation of control levers, control valves operable under the pilot pressure to control hydraulic actuators, and a direction changeover valve disposed between the pilot pressure generators and control valves. The direction changeover valve is operable to change control patterns.

However, this system also requires the number of valve positions corresponding to the number of control patterns made available. This results in a direction changeover valve having a large and complicated construction.

SUMMARY OF THE INVENTION

The object of the present invention is to provide a control change system which may be changed from one control pattern to another in a simple way.

The above object is fulfilled, according to the present invention, by a control change system for a hydraulic working vehicle having operating means shiftable to a plurality of control positions, the system comprising a plurality of hydraulic actuators; a plurality of pilot-operated control valves for controlling pressure oil supply to the hydraulic actuators, respectively; pilot pressure generating means for generating a pilot pressure in accordance with the control positions of the operating means; pilot pressure switching means for receiving the pilot pressure from the pilot pressure generating means and outputting the pilot pressure selectively to the control valves, the pilot pressure switching means including an input section for receiving the pilot pressure from the pilot pressure generating means, an output section connected to the control valves for outputting the pilot pressure to the control valves, and a plurality of spools slidable to change communicating passages between the input section and the output section; and switching control means for selectively sliding the plurality of spools, the switching control means including a switch lever rockable between a first position and a second position, and a link mechanism having one end thereof connected to the switch lever, and the other end connected to at least one of the spools, for sliding said one of the spools with rocking movement of the switch lever.

The control change system as constructed above may be employed for a backhoe, for example, to facilitate pattern changing. In this case, when the switch lever is set to the first position, a right control lever constituting the operating means in combination with a left control lever is operable in a fore and aft direction to control a boom cylinder, and the left control lever is operable in the fore and aft direction to control an arm cylinder. When the switch lever is set to the second position, the right control lever is operable in the fore and aft direction to control the arm cylinder, and the left control lever is operable in the fore and aft direction to control the boom cylinder.

The control change system may further include a second switch lever. In this case, when the second switch lever is set to a first position, a suitable control lever may be used to turn the swivel deck. When the second switch lever is set to a second position, the above control lever may be used to swing the boom assembly.

Other objects and features of this invention will be understood from the following description made with reference to the accompanying drawings.

BRIEF DESCRIPTION OF THE DRAWINGS

FIG. 9 is a table showing spool positions corresponding to control patterns I through VI, FIG. 10 is a table showing actions taken in control patterns I through VI.

DETAILED DESCRIPTION OF THE PREFERRED EMBODIMENTS

Figure 1:
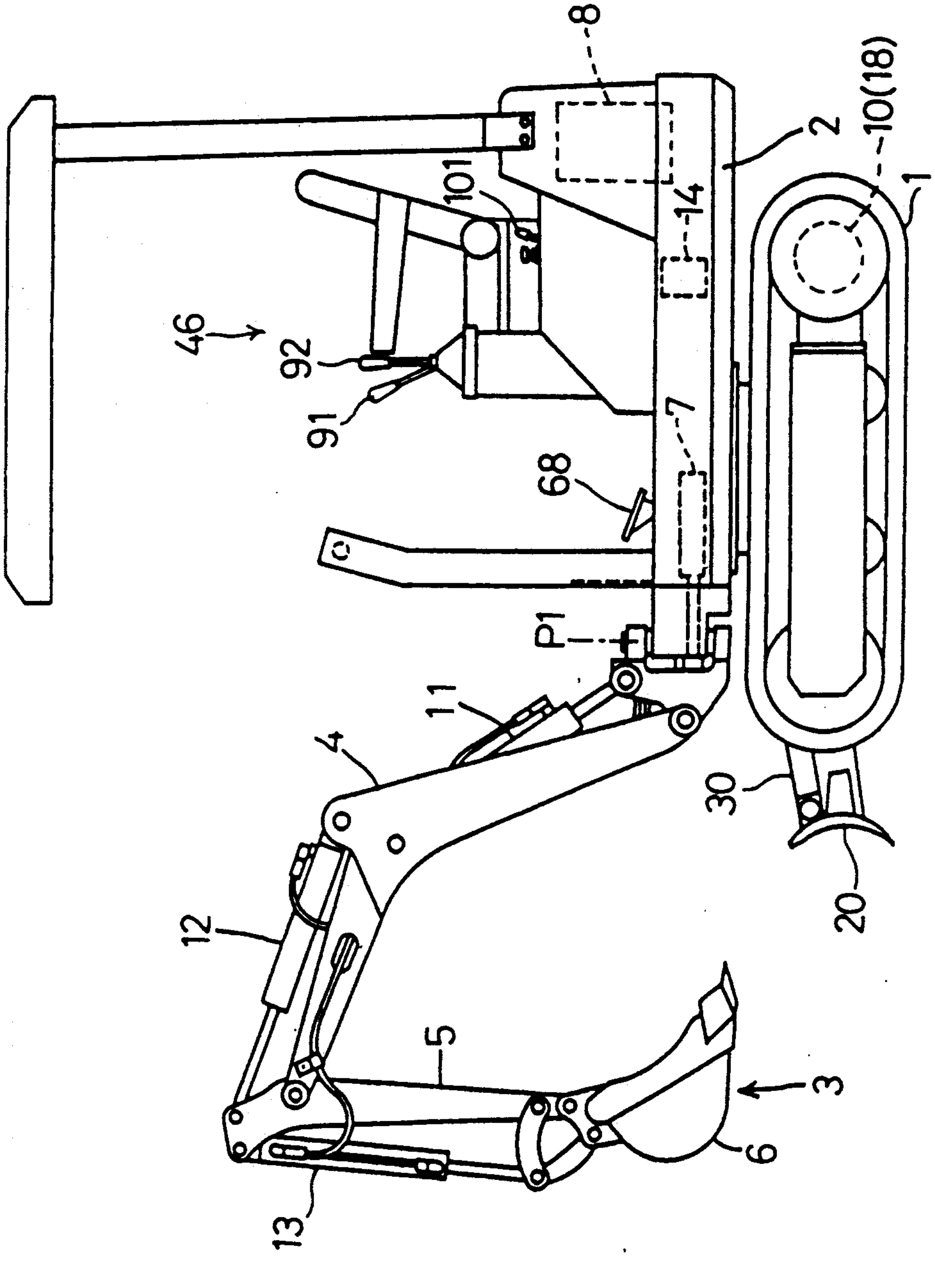
FIG. 1 is a side elevation of a backhoe having a control change system according to the present invention.

FIG. 1 shows a side elevation of a backhoe which is one example of hydraulic working vehicles. The backhoe comprises crawler running devices 1, a swivel deck 2 mounted thereon, and a boom assembly 3 connected to the front of the swivel deck 2. The boom assembly 3 includes a boom 4 vertically swingable by a first hydraulic cylinder 11, an arm 5 swingable fore and aft by a second hydraulic cylinder 12, and a bucket 6 pivotable for scooping action by a third hydraulic cylinder 13. The entire boom assembly 3 is supported to be swingable on a vertical axis P at the front of the swivel deck 2 by a swing cylinder 7. The swivel deck 2 is turned round by a hydraulic motor 14.

A hydraulic circuit for operating the first, second and third hydraulic cylinders 11–13, hydraulic motor 14 and swing cylinder 7 will be described next.

Figure 2:
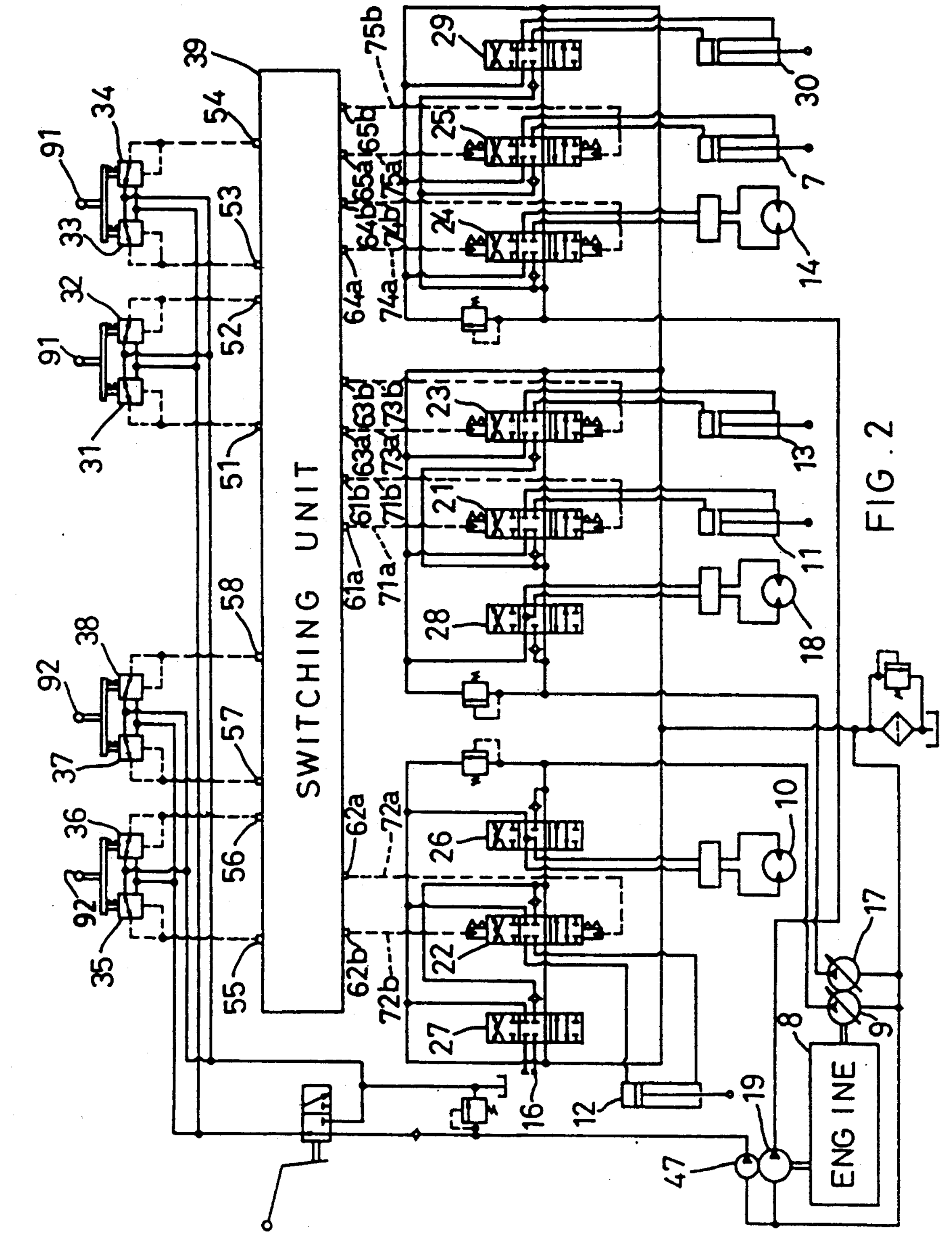
FIG. 2 is a hydraulic circuit diagram showing an interlocking arrangement between right and left control levers and various control valves.
Figure 3:
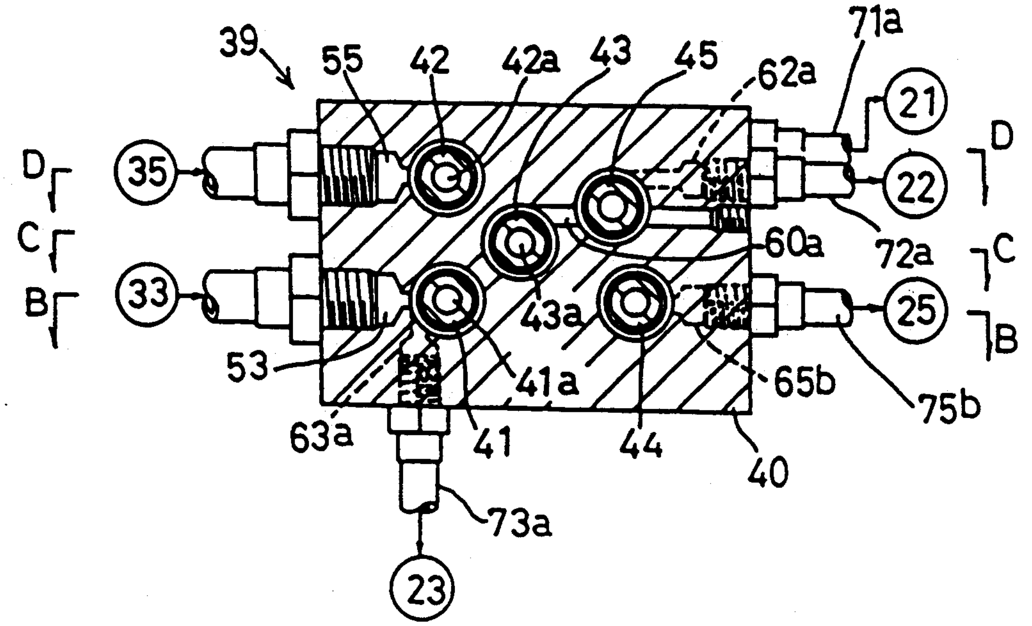
FIG. 3 is a cross section of a hydraulic switching unit.
Figure 6:
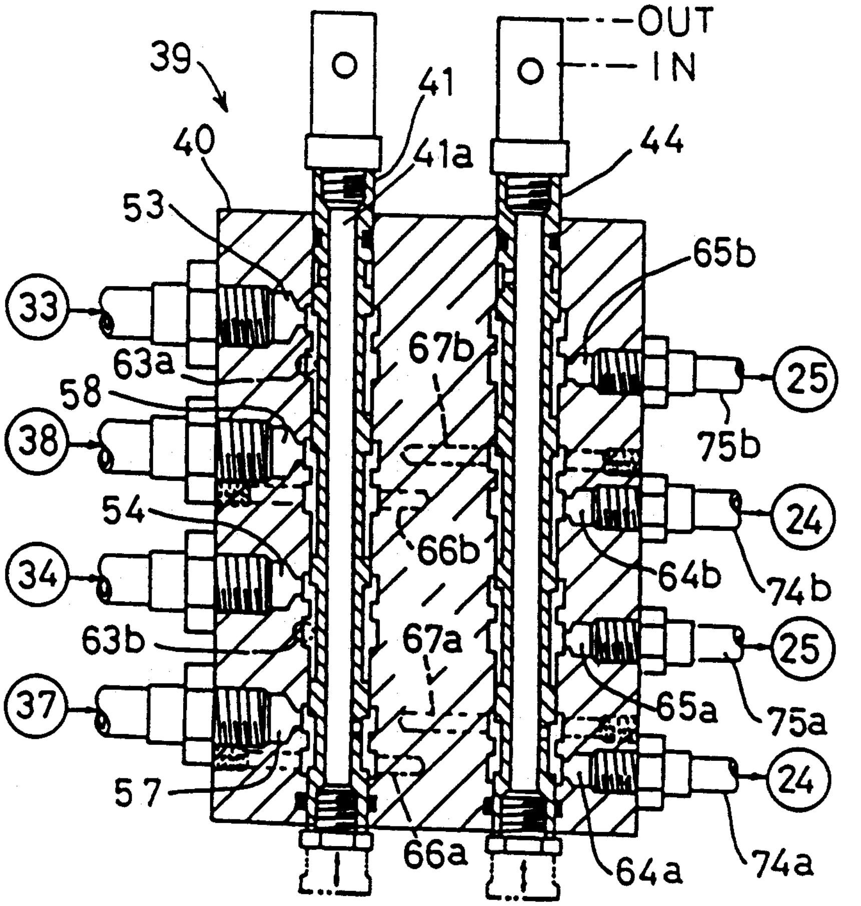
FIG. 6 is a section taken on line B—B of FIG. 3.
Figure 5:
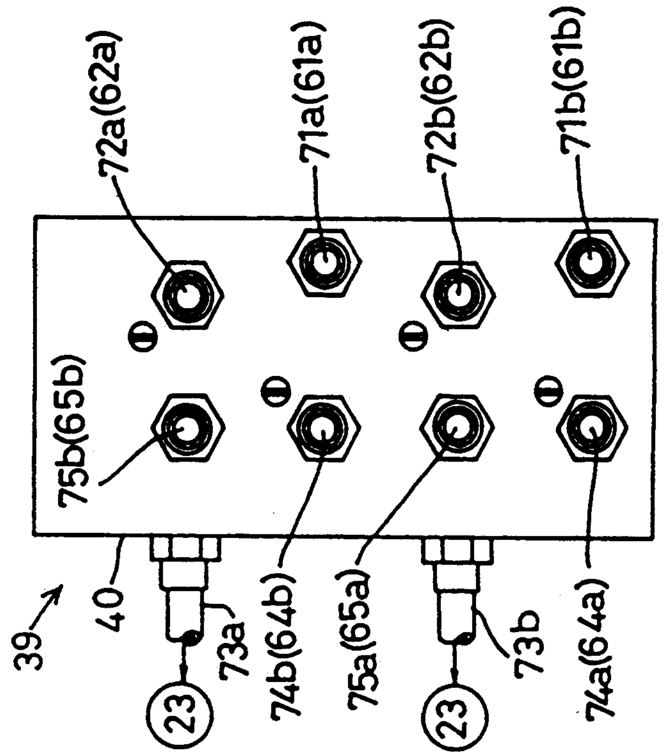
FIG. 5 is a side view of the switching unit showing output ports thereof.
Figure 4:
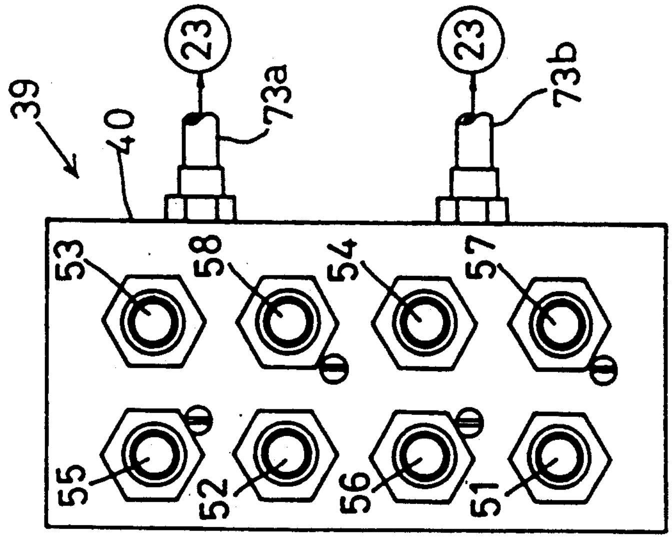
FIG. 4 is a side view of the switching unit showing input ports thereof.
Figure 8:
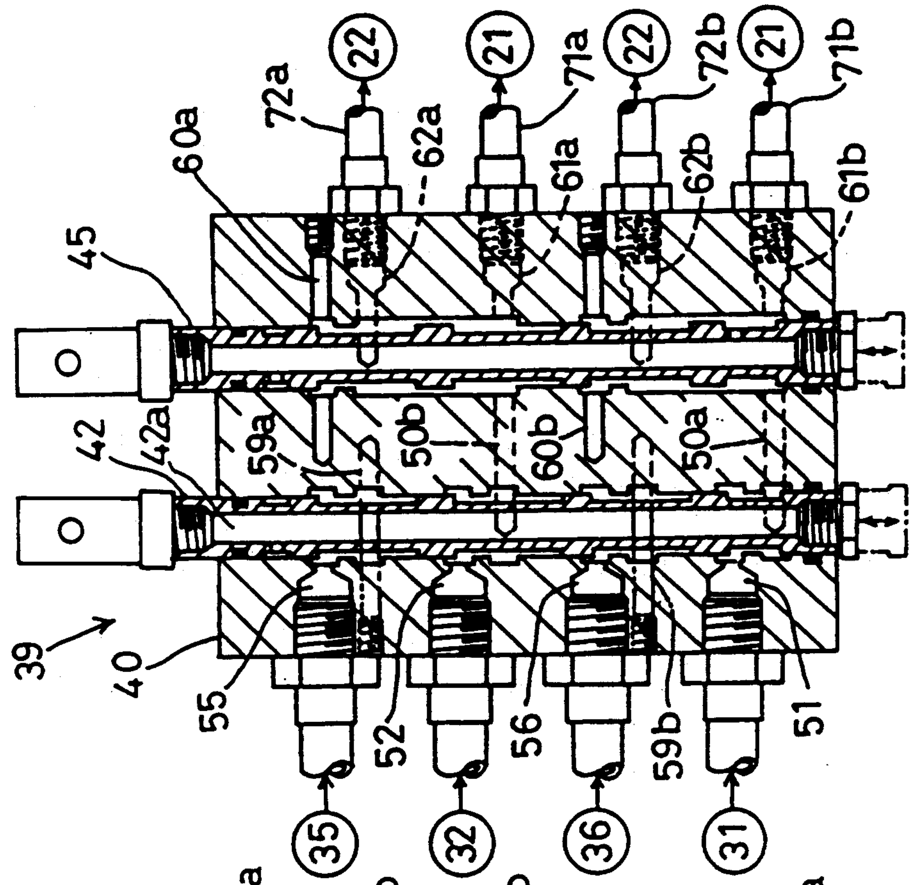
FIG. 8 is a section taken on line D—D of FIG. 3.
Figure 7:
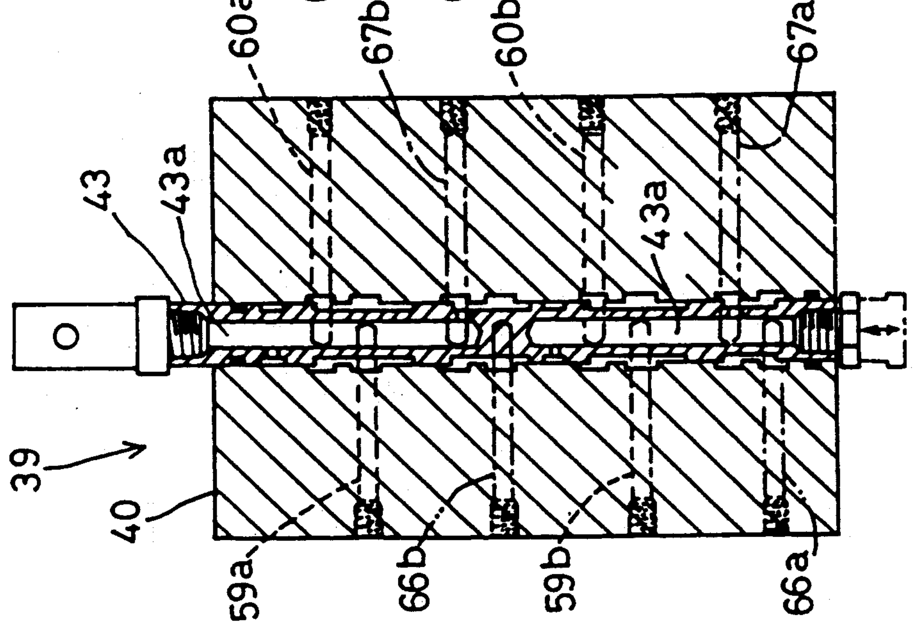
FIG. 7 is a section taken on line C—C of FIG. 3.

Referring to FIG. 2, the hydraulic circuit includes a first pump 9 of the variable displacement type driven by an engine 8. The first pump 9 supplies pressure oil to a sixth control valve 26 connected to a hydraulic motor 10 for driving the left crawler running device 1, a second control valve 22 connected to the second hydraulic cylinder 12 for driving the arm 5, and a seventh control valve 27 connected to a service port 16. A second pump 17 of the variable displacement type driven by the engine 8 supplies pressure oil to an eighth control valve 28 connected to a hydraulic motor 18 for driving the right crawler running device 1, a first control valve 21 connected to the first hydraulic cylinder 11 for driving the boom 4, and a third control valve 23 connected to the third hydraulic cylinder 13 for driving the bucket 6. A third pump 19 driven by the engine 8 supplies pressure oil to a fourth control valve 24 connected to the hydraulic motor 14 for driving the swivel deck 2, a fifth control valve 25 connected to the swing cylinder 7, and a ninth control valve 29 connected to a lift cylinder 30 for raising and lowering a dozer blade 20 shown in FIG. 1.

The first to fifth control valves 21–25 are neutral-returning, pilot-operated valves. A control structure for operating the first to fifth control valves 21–25 will be described next.

As shown in FIG. 1, the swivel deck 2 carries a driver's section 46 including a right control lever 91 and a left control lever 92 arranged side by side in a forward portion thereof. These control levers 91 and 92 are operable for and aft and right and left. The right control lever 91 has a first to a fourth pilot valves 31–34 for generating a pilot pressure in response to operation of the control lever 91. Similarly, the left control lever 92 has a fifth to an eighth pilot valves 35–38. A fourth pump 47 driven by the engine 8 supplies pressure oil to the first to eighth pilot valves 31–38. The pilot valves 31–38 supply the pilot pressure through a hydraulic switching unit 39 to the first to fifth control valves 21–25. The switching unit 39 is operable to direct the pilot pressure supply to a selected one of the control valves 21–25.

Details of this hydraulic switching unit 39 will be described next.

As shown in FIGS. 3 through 8, the hydraulic switching unit 39 comprises a main block 40 including a first to a fifth slidable spools 41–45 arranged parallel to one another and distributed to different planes.

The first to eighth pilot valves 31–38 supply the pilot pressure to a first to an eighth input ports 51–58 arranged on a lateral face of the main block 40. The main block 40 has a first to a fifth output ports 61*a*, 61*b* through 65*a*, 65*b* arranged on different lateral faces thereof. As shown in FIG. 2, a first to a fifth pilot oil lines 71*a*, 71*b* through 75*a*, 75*b* extend between the output ports 61*a*–65*b* and the control valves 21–25.

With the above construction, various connecting lines from input port to output port may be selected in accordance with spool positions as shown in FIG. 9, in which "OUT" indicates spool positions projecting from the main block 40, and "IN" indicates positions depressed into the main block 40. FIG. 9 also includes Roman numerals I to VI which represent control patterns resulting from the various spool positions.

When pattern I in FIG. 9 is selected, for example, and the right control lever 91 is operated forward or backward, the pilot pressure is supplied from the first or second pilot valve 31 or 32 to the first control valve 21 through the first or second input port 51 or 52, the second spool 42, an inside oil passage 50*a* or 50*b*, the first output port 61*b* or 61*a*, and the first pilot oil line 71*b* or 71*a*. As a result, the first control valve 21 for controlling the boom 4 is operated to a lowering position or a raising position. When the right control lever 91 is operated right or left, the pilot pressure is supplied from the third or fourth pilot valve 33 or 34 to the third control valve 23 through the third or fourth input port 53 or 54, the first spool 41, the third output port 63*a* or 63*b*, and the third pilot oil line 73*a* or 73*b*. As a result, the third control valve 23 for controlling the bucket 6 is operated to an unloading position or a loading position. Similarly, when the left control lever 92 is operated forward or backward, the pilot pressure is supplied from the fifth or sixth pilot valve 35 or 36 to the second control valve 22 through the fifth or sixth input port 55 or 56, the second spool 42, an inside oil passage 59*a* or 59*b*, the third spool 43, an inside oil passage 60*a* or 60*b*, the fifth spool 45, the second output port 62*a* or 62*b*, and the second pilot oil line 72*a* or 72*b*. As a result, the first control valve 22 for controlling the arm 5 is operated to a raising position or a loading position. When the left control lever 92 is operated right or left, the pilot pressure is supplied from the seventh or eighth pilot valve 37 or 38 to the fourth control valve 24 through the seventh or eighth input port 57 or 58, the first spool 41, an inside oil passage 67*a* or 67*b*, the fourth spool 44, the fourth output port 64*a* or 64*b*, and the fourth pilot oil line 74*a* or 74*b*. As a result, the fourth control valve 24 for controlling the swivel deck 2 is operated to a right swivel position or a left swivel position. The relations between operation of the right and left control levers 91 and 92 and movement of the backhoe components are shown as pattern I in FIG. 10.

When pattern II in FIG. 9 is selected, i.e. the third spool 43 is depressed, no change occurs in the effects produced by the operation of the right control lever 91, as shown in pattern II in FIG. 10. However, the third spool 43 and an inside oil line 43a transmit the backward and forward operation of the left control lever 92 to the fourth control valve 24 for controlling the swivel deck 2, and the right and left operation thereof to the second control valve 22 for controlling the arm 5.

When pattern III in FIG. 9 is selected, i.e. the first and second spools 41 and 42 are depressed, the changes shown in pattern III in FIG. 10 take place. That is, the second spool 42 transmits the backward and forward operation of the right control lever 91 to the second control valve 22 for controlling the arm 5, and the first spool 41 and inside oil passage 41a transmit the right and left operation thereof to the fourth control valve 24 for controlling the swivel deck 2. Further, the second spool 42 and an inside oil line 42a transmit the backward and forward operation of the left control lever 92 to the first control valve 21 for controlling the boom 4, and the first spool 41 transmits the right and left operation thereof to the third control valve 23 for controlling the bucket 6.

When pattern IV in FIG. 9 is selected, i.e. the first, second and fifth spools 41, 42 and 45 are depressed, the backward and forward operation of the right control lever 91 is interlocked with the second control valve 22 for controlling the arm 5 as shown in pattern IV in FIG. 10, and reversed from pattern III. The other functions are the same as when pattern III is used.

When pattern V in FIG. 9 is selected, i.e. the first spool 41 is depressed, the first spool 41 and inside oil passage 41a transmit and the right and left operation of the right control lever 91 to the fourth control valve 24 for controlling the swivel deck 2, and the right and left operation of the left control lever 92 to the third control valve 23 for controlling the bucket 6 as shown pattern V in FIG. 10 and reversed from pattern I. The other functions are the same as when the pattern I is used.

When pattern VI in FIG. 9 is selected, i.e. the second and fifth spools 42 and 45 are depressed, the backward and forward operation of the right control lever 91 is interlocked with the second control valve 22 for controlling the arm 5, and the backward and forward operation of the left control lever 92 is interlocked with the first control valve 22 for controlling the boom 4 as shown in pattern VI in FIG. 10. The other functions are the same as when the pattern I is used.

Figure 11:
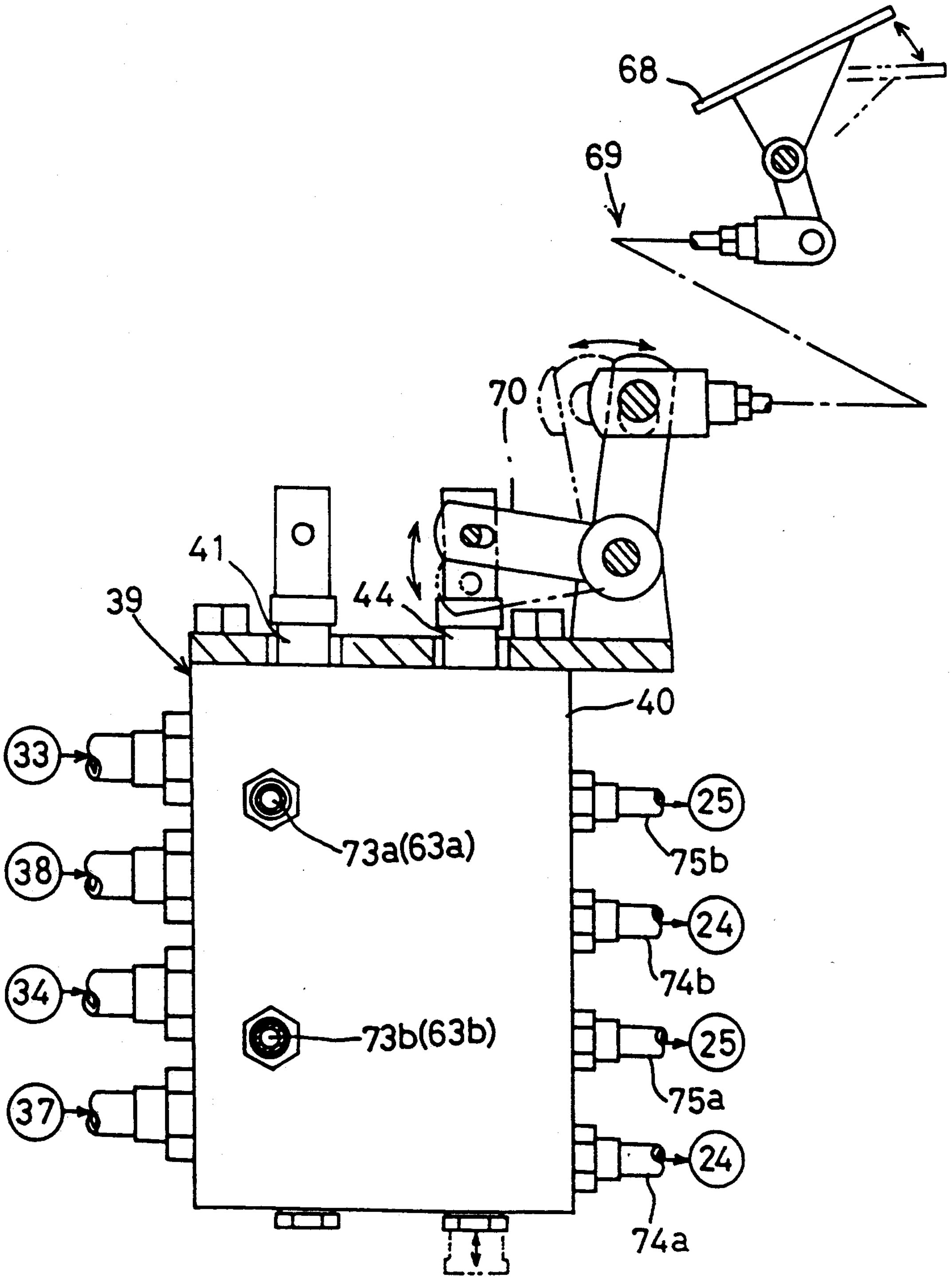
FIG. 11 is a side view showing an interlocking structure between the hydraulic switching unit and a switching pedal.

The functions of the fourth spool 44 will now be described. As shown in FIG. 11, the fourth spool 44 is interlocked with a switch pedal 68 through an interlocking link 69 and a control arm 70. When the switch pedal 68 is operated to depress the fourth spool 44 into the main block 40, the pilot pressure for the fourth output port 64a or 64b is supplied through the inside oil passage 67a or 67b to the fifth output port 65a or 65b. That is, the right and left swivels in patterns I through VI in FIG. 10 are replaced by right and left swings of the boom assembly 3 caused by extension and contraction of the swing cylinder 7. The switch pedal 68 is used to select swiveling of the swivel deck 2 or horizontal swinging of the boom assembly 3 for effecting horizontal movement of the bucket 6. This selection, as distinct from the above pattern selection, is carried out frequently during an earth moving operation.

Figure 12:
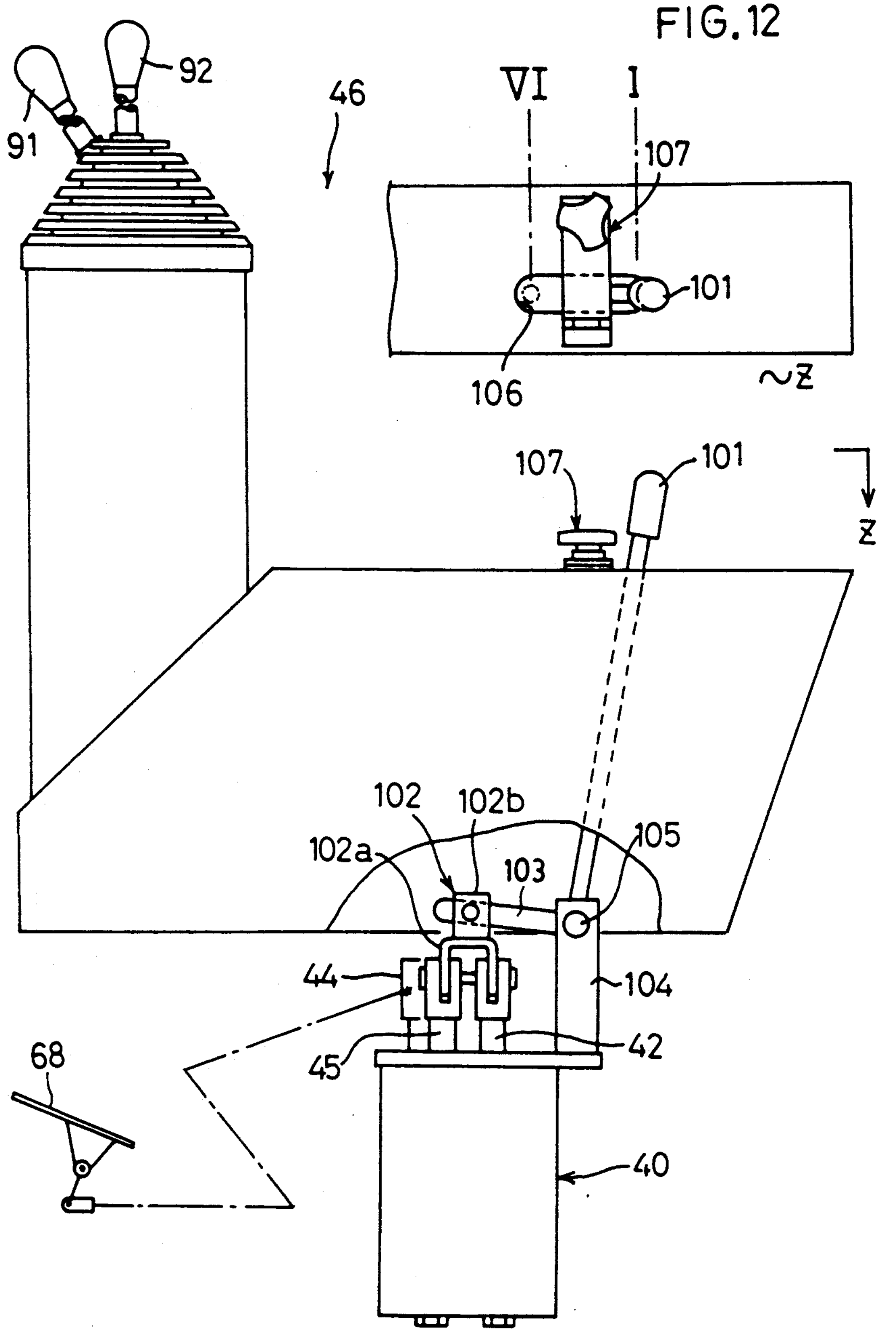
FIG. 12 is a side view showing an interlocking structure between a hydraulic switching unit and a switching lever of a control change system in a different embodiment of the invention.
Figure 13:
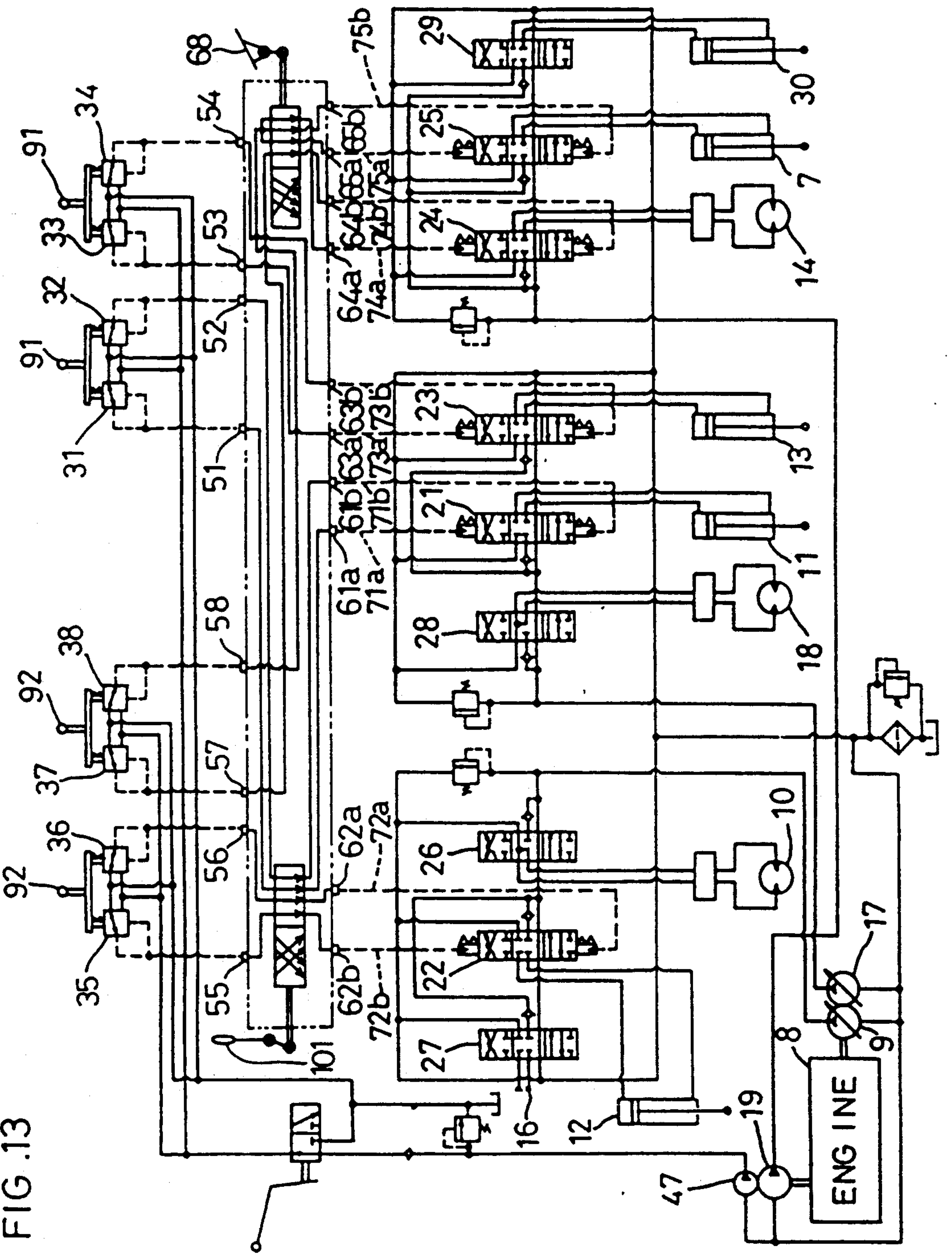
FIG. 13 is a hydraulic circuit diagram of the control change system shown in FIG. 12.

FIG. 12 shows a modified control pattern changing system according to the invention. In order to switch among the patterns I–VI shown in FIG. 10, this system includes a switch lever 101 disposed laterally of the driver's section 46 and connected to the second spool 42 and fifth spool 45 through a bracket 102 and a connecting arm 103. The bracket 102 includes a fork 102a pivotally connected to the second spool 42 and fifth spool 45, and a handle portion 102b pivotally connected to one end of the connecting arm 103. The other end of the connecting arm 103 is fixed to a pivot axis 105 provided on a supporting bracket 104 fixed to the hydraulic unit block 40. The switch lever 101 is also fixed to the pivot axis 105. An upper portion of the switch lever 101 extends upward through a guide slot 106 formed in an upper surface of a control box. The switch lever 101 is rockable between right end and left end of the guide slot 106. The first spool 41 and third spool 43 are fixed in respective projecting positions by means of spacers or the like. FIG. 9 illustrates the different patterns for the controls for patterns I through VI. As shown, to select pattern I, the first, second, third, and fifth spools are set to be in an OUT position and similarly to select pattern VI, the first and third spools are to be in the OUT position and the second and fifth spools are set to be in the IN position. In other words, to choose pattern I or pattern VI interchangeable, the first and third spools can be fixed to be in the OUT position and the second and fifth spools are to be shifted between the OUT and the IN positions. Since the first and third spools are fixed in the embodiment, selecting patterns other than patterns I and VI mentioned above is not possible. However, this embodiment is designated in case only two patterns are to be selected. Consequently, in case more pattern change is required, additional switch levers similar to lever 101 described above should be equipped to connect with the first spool and/or the third spool for switching them between OUT and IN positions. FIG. 13 shows a hydraulic circuit for operating this control pattern changing system.

When the switch lever 101 is moved to the right end of the guide slot 106, the second spool 42 and fifth spool 45 are projected to select control pattern I as seen from FIG. 9. Conversely, when the switch lever 101 is moved to the left end of the guide slot 106, the second spool 42 and fifth spool 45 are depressed to select control pattern VI as seen from FIG. 9. For convenience of this switching operation, "Pattern A" and "Pattern B" are marked at the righthand and lefthand ends, respectively, of the guide slot 106. Since this switching operation is carried out infrequently, a shut-off mechanism 107 is provided to shut off an intermediate position of the slot 106 in order to prevent inadvertent movement of the switch lever 101. The shut-off mechanism 107 includes a plate pivotally supported on the upper surface of the control box, and a set screw for fixing the plate to a closed position.

What is claimed is:

1. A control change system for a hydraulic working vehicle having operating means shiftable to a plurality of control positions, comprising:

a plurality of hydraulic actuators;

a plurality of pilot-operated control valves for controlling pressure oil supply to said hydraulic actuators, respectively;

pilot pressure generating means for generating a pilot pressure in accordance with said control positions of said operating means;

pilot pressure switching means for receiving said pilot pressure from said pilot pressure generating means and outputting said pilot pressure selectively to said control valves, said pilot pressure switching means including:

an input section for receiving said pilot pressure from said pilot pressure generating means;

an output section connected to said control valves for outputting said pilot pressure to said control valves; and a plurality of spools slidable to change communicating passages between said input section and said output section; and switching control means for selectively sliding said plurality of spools, said switching control means including:

a switch lever rockable between a first position and a second position; and a link mechanism having one end thereof connected to said switch lever, and the other end connected to at least one of said spools, for sliding said one of said spools with rocking movement of said switch lever.

2. A control change system as claimed in claim 1, wherein said switching control means includes retainer means for fixing said switch lever to one of said first position and said second position.

3. A control system for a backhoe having a first hydraulic actuator for vertically swinging a boom of a boom assembly, a second hydraulic actuator for swinging an arm of the boom assembly fore and aft, a third hydraulic actuator for driving a bucket of the boom assembly in a scooping direction, a fourth hydraulic actuator for horizontally swinging the boom assembly, a fifth hydraulic actuator for turning a swivel deck, and a first control lever and a second control lever each operable fore and aft and right and left for controlling the first and second hydraulic actuators, said control system comprising:

a first to a fifth pilot-operated control valves for supplying and exhausting pressure oil to/from said first to fifth hydraulic actuators;

pilot valves for generating a pilot pressure corresponding to fore and aft and right and left operations of said first and second control levers, respectively; and a hydraulic switching unit for relaying the pilot pressure from said pilot valves and supplying the pilot pressure to said first to fifth pilot-operated control valves, said hydraulic switching unit including a plurality of slidable spools for supplying the pilot pressure from said pilot valves selectively to said first to fourth pilot-operated control valves;

switching means for selectively sliding said plurality of slidable spools, said switching means including:

a first switching member movable between at least two positions for selecting one of said fourth hydraulic actuator and said fifth hydraulic actuator to be controlled by a shift in one direction of said first control lever; and a second switching member movable between at least two positions for switching interlocks between said first and second control levers and said first and second hydraulic actuators.

4. A control system as claimed in claim 3, wherein said second switching member includes retainer means for fixing said switching member to an operative position.

5. A control system as claimed in claim 3, wherein said first switching member is a foot-operated lever disposed adjacent a foot rest, and said second switching member is a hand-operated lever disposed adjacent a driver's seat.

* * * * *